United States Patent
Cho et al.

(10) Patent No.: US 7,439,938 B2
(45) Date of Patent: Oct. 21, 2008

(54) MULTI-DISPLAY APPARATUS HAVING AN OPTICAL PATH CHANGING DEVICE

(75) Inventors: Kun-ho Cho, Gyeonggi-do (KR);
Dae-sik Kim, Gyeonggi-do (KR);
Hee-joong Lee, Gyeonggi-do (KR);
Tae-hee Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 285 days.

(21) Appl. No.: 10/461,327

(22) Filed: Jun. 16, 2003

(65) Prior Publication Data

US 2003/0231144 A1  Dec. 18, 2003

(30) Foreign Application Priority Data

Jun. 17, 2002 (KR) .................. 10-2002-0033725

(51) Int. Cl.
G09G 5/00 (2006.01)

(52) U.S. Cl. .................. 345/1.3; 345/1.1; 345/50; 345/55; 349/95

(58) Field of Classification Search .................. 345/1.3, 345/1.1, 50, 55; 349/95
See application file for complete search history.

(56) References Cited

U.S. PATENT DOCUMENTS 5,751,387 A * 5/1998 Iigahama et al. ............... 349/95
6,726,859 B2 * 4/2004 Sekiguchi et al. ............ 264/2.5

FOREIGN PATENT DOCUMENTS

| EP | 0550155 | 7/1993 |
|----|---------|--------|
| JP | 60-227233 | 11/1985 |
| JP | 60227233 | 11/1985 |
| JP | 05-061031 | 3/1993 |
| JP | 5-61031 | 3/1993 |
| JP | 5-143007 | 6/1993 |
| JP | 05-061031 | * 12/1993 |
| JP | 9-37194 | 2/1997 |
| JP | 10-293542 | * 4/1998 |
| JP | 10-293542 | 11/1998 |
| JP | 2001-13878 | 1/2001 |
| JP | 2003-50554 | 2/2003 |
| KR | 10-2001-0079129 | 8/2001 |

(Continued)

OTHER PUBLICATIONS

Chinese Office Action mailed on Jul. 22, 2005 in Chinese Patent Application No. 03102989.2 which corresponds to U.S. Appl. No. 10/461,327.

(Continued)

*Primary Examiner*—Richard Hjerpe
*Assistant Examiner*—Leonid Shapiro
(74) *Attorney, Agent, or Firm*—Staas & Halsey LLP

(57) ABSTRACT

A multi-display apparatus includes flat panel display devices and an optical path changing unit. The flat panel display devices include adjacent sides connected to each other. The optical path changing unit has an inclined surface symmetrical to a boundary surface of the flat panel display devices and shifting light emitted from the flat panel display devices toward a boundary surface between the flat panel display devices to display an image without a non-display area.

36 Claims, 10 Drawing Sheets

FOREIGN PATENT DOCUMENTS

| | | |
|---|---|---|
| RU | 2106713 | 3/1998 |
| RU | 2165113 | 4/2001 |
| WO | 02/25362 | 3/2002 |

OTHER PUBLICATIONS

Mosaic Display Mullion Correction, IBM Technical Disclosure Bulletin, vol. 32, No. 3B, Aug. 1989.

Japan Office Action dated Mar. 15, 2005 of the Japanese Patent Application No. 2003-158438.

Mosaic Display Mullion Correction, IBM Technical Disclosure Bulletin, Col. 32, No. 3B, Aug. 1989.

Korean Office Action issued Feb. 27, 2008 in corresponding Korean Patnet Application No. 10-2002-0033725.

* cited by examiner

MULTI-DISPLAY APPARATUS HAVING AN OPTICAL PATH CHANGING DEVICE

CROSS-REFERENCE TO RELATED APPLICATIONS

This application claims the benefit of Korean Application No. 2002-33725, filed Jun. 17, 2002, in the Korean Intellectual Property Office, the disclosure of which is incorporated herein by reference.

BACKGROUND OF THE INVENTION

1. Field of the Invention

The present invention relates to a multi-display apparatus having a plurality of flat panel display devices, and more particularly, to a multi-display apparatus which provides an image without a non-display area.

2. Description of the Related Art

A multi-display apparatus is defined as a display apparatus forming one screen area by connecting a plurality of flat panel display devices. Of the multi-display apparatuses, a folding type display apparatus is often used for a portable device such as a notebook computer, while a large screen display apparatus is widely used as a display in a stadium, for instance, or as an advertisement display elsewhere.

FIG. 1 shows a conventional folding type display apparatus of a notebook computer. The folding type display apparatus is formed of a screen 11 and a main body 13. The screen 11 is encompassed by a light shield area 15 having a predetermined width d1. The light shield area 15 decreases the width of the screen 11 so that a user has a sensation of visual narrowness when viewing the screen 11.

FIG. 2 is a plan view of a flat panel display apparatus connecting two conventional LCD panels. Referring to the drawing, a non-display area 18 having a width d2 appears between two screens 14 and 16, which separates an image so that an image quality is lowered.

In the conventional display apparatus having the plurality of flat panel display devices, a boundary surface of a screen corresponding to a portion in which the flat panel display devices are connected, through which no light passes, is closed with a light shield member. Accordingly, the non-display area where the image is not displayed divides the image and lowers a resolution thereof, thus, deteriorating the image quality.

SUMMARY OF THE INVENTION

To solve the above and/or other problems, the present invention provides a multi-display apparatus which displays an image without a non-display area on a screen in a display apparatus having a plurality of flat panel display devices connected to each other.

Additional objects and advantages of the invention will be set forth in part in the description which follows and, in part, will be obvious from the description, or may be learned by practice of the invention.

According to an aspect of the present invention, a multi-display apparatus includes flat panel display devices having adjacent sides connected to each other; and an optical path changing unit having an inclined surface symmetrical to a boundary surface of the flat panel display devices and shifting light emitted from the flat panel display devices toward a boundary surface between the flat panel display devices to display an image without a non-display area.

According to an aspect of the present invention, the optical path changing unit includes a triangular prism array having an inclined surface symmetrical with respect to the boundary surface. The triangular prism array includes an upper triangular array and a lower triangular array in which an inclination surface of the upper triangular prism array and an inclination surface of the lower triangular prism array are symmetrical.

According to an aspect of the present invention, the optical path changing unit includes a wave guide array having an inclined surface symmetrical to the boundary surface. The optical path changing unit includes an assembly of a wave guide array having an inclined surface symmetrical to the boundary surface and a triangular prism array disposed on an upper surface of the wave guide array and having a surface inclined in a direction opposite to the inclined surface of the wave guide array and symmetrical to the boundary surface.

According to an aspect of the present invention, the optical path changing unit includes an assembly of a first triangular prism array having an inclined surface symmetrical to the boundary surface, a wave guide array having an inclined surface inclined in a same direction as the first triangular prism array and symmetrical to the boundary surface, and a second triangular prism array disposed on an upper surface of the wave guide array and having an inclined surface symmetrical to the first triangular prism array.

According to an aspect of the present invention, the optical path changing unit is a Fresnel lens type triangular prism array formed of triangular prisms having inclined surfaces symmetrical to the boundary surface and arranged concentrically with respect to a center of each of the flat panel display devices. In the triangular prism array, an inclination angle of the inclined surface decreases as a triangular prism in the triangular prism array is positioned farther away from the boundary surface.

According to an aspect of the present invention, the flat panel display device is any one of an LCD, a PDP, an FED, and an EL.

According to an aspect of the present invention, there is provided a multi-display apparatus, including: flat panel devices having adjacent sides connected to each other forming a boundary surface therebetween, including upper and lower substrates, a pair of transparent electrodes, one formed on a lower surface of the upper substrate and another on an upper surface of the lower substrate, a pair of insulation layers deposited on the transparent electrodes, and a pair of alignment layers formed on the insulation layers; and a triangular prism array arranged on an upper surface of the flat panel devices shifting light emitted from the flat panel display devices toward the boundary surface.

According to an aspect of the present invention, there is provided a multi-display apparatus, including: flat panel devices having adjacent sides connected to each other forming a boundary surface therebetween; and first and second triangular prism arrays arranged on a surface of the flat panel devices shifting light emitted from the flat panel display devices toward the boundary surface.

According to an aspect of the present invention, there is provided a multi-display apparatus, including: flat panel devices having adjacent sides connected to each other forming a boundary surface therebetween; and a wave guide array arranged on a surface of the flat panel devices and including a plurality of wave guides parallel to one another and inclined at a predetermined angle with respect to the boundary surface, wherein the wave guide array shifts light emitted from the flat panel display devices toward the boundary surface.

According to an aspect of the present invention, there is provided a multi-display apparatus, including: flat panel devices having adjacent sides connected to each other forming a boundary surface therebetween; and a wave guide array and a triangular prism array arranged on a surface of the flat panel devices shifting light emitted from the flat panel display devices toward the boundary surface.

According to an aspect of the present invention, there is provided a multi-display apparatus, including: flat panel devices having adjacent sides connected to each other forming a boundary surface therebetween; a first triangular prism array arranged on a surface of the flat panel devices; a wave guide array disposed above the first triangular prism array and separated a predetermined distance therefrom; and a second triangular prism array disposed on the wave guide array, wherein the first triangular prism array, the wave guide array, and the second triangular prism array shift light emitted from the flat panel display devices toward the boundary surface.

According to an aspect of the present invention, there is provided a multi-display apparatus, including: flat panel devices having adjacent sides connected to each other forming a boundary surface therebetween; Fresnel lens type triangular prisms coaxially arranged on each of the flat panel display devices, wherein the triangular prisms are arranged symmetrically to a left and a right of a center portion of each of the flat panel display devices and the boundary surface to form a triangular prism array to shift light emitted from the flat panel display devices toward the boundary surface.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
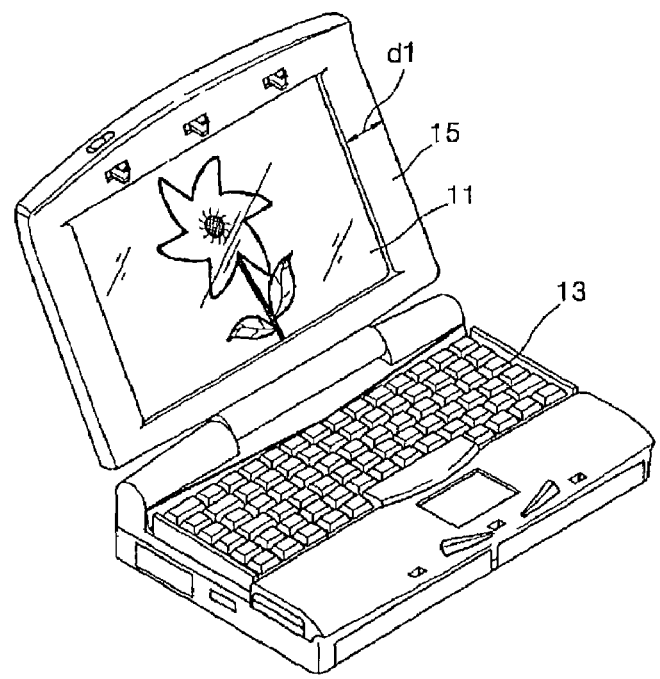
FIG. 1 is a perspective view illustrating a conventional folding type display apparatus.
Figure 2:
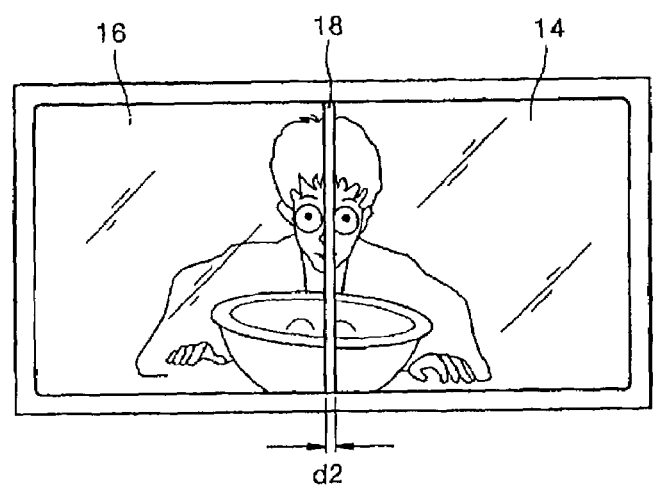
FIG. 2 is a plan view of a conventional large screen display apparatus.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
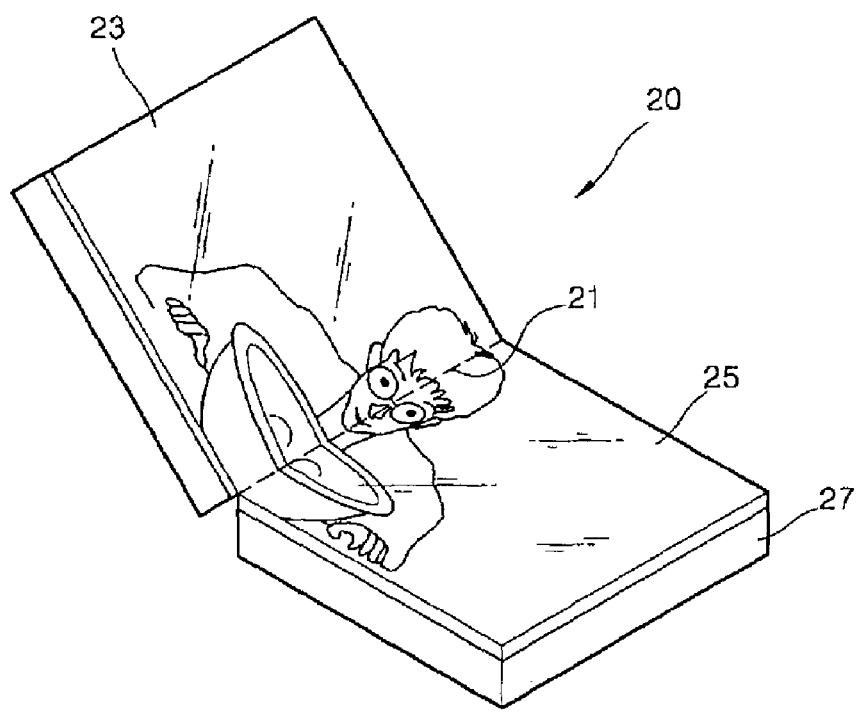
FIG. 3 is a perspective view illustrating a folding type display apparatus, according to an aspect of the present invention.

Referring to FIG. 3, a folding type display apparatus 20 of a multi-display apparatus, according to an aspect of the present invention, includes two screens 23 and 25, one side of the screen 23 contacting an adjacent side of the screen 25, and a main body 27 disposed at a lower surface of each of the screens 23 and 25. Two flat panel display devices (not shown) are connected inside the main body 27 and a connection portion remains as a light shield area which does not transmit light. In the present invention, an optical path changing device (to be shown in FIGS. 5A-10B) is arranged on an upper surface of the flat panel display devices including a connection portion to move an optical path to a boundary surface 21 between the screens 23 and 25 so that, as shown in the drawing, the non-display area can be removed from the boundary surface 21 of the screens 23 and 25.

Here, although liquid crystal devices (LCD), field effect displays (FED), plasma display panels (PDP), or electroluminescent displays (EL) may be provided as the flat panel display devices, the present invention is not limited thereto.

Figure 4:
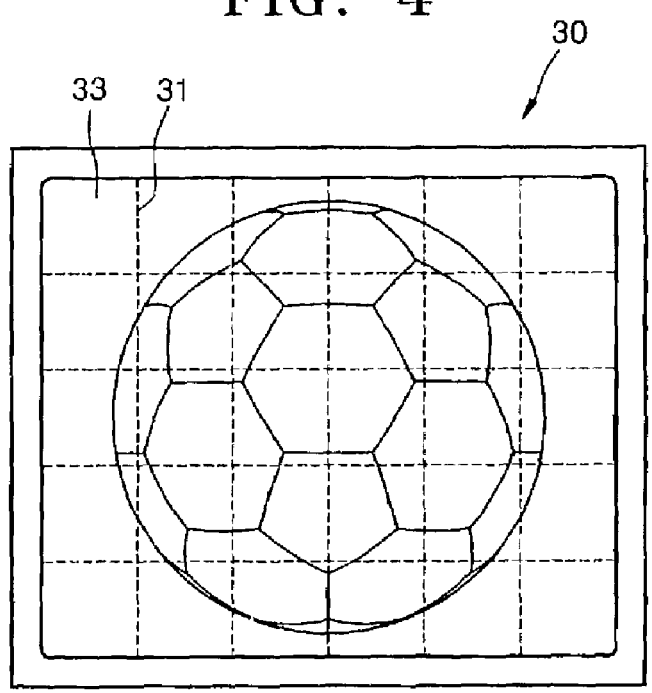
FIG. 4 is a plan view illustrating a large screen display apparatus, according to an aspect of the present invention.

FIG. 4 shows a large screen display apparatus 30 of the multi-display apparatus, according to an aspect of the present invention. Screens 33 are arranged like a checkerboard to present a single image. It can be seen that no non-display area appears in boundary surfaces 31 between the screens 33 like the folding type display apparatus 20 shown in FIG. 3.

As shown in FIGS. 3 and 4, the multi-display apparatus, according to an aspect of the present invention, is realized by providing an optical path changing device on the upper surface of the flat panel display device.

FIGS. 5A through 9 illustrate multi-display apparatuses according to first through fifth aspects of the present invention, which are mainly used as the folding type display apparatus. FIGS. 10A and 10B illustrate the multi-display apparatuses, according to a sixth aspect of the present invention, which is mainly used as the large screen display apparatus.

Figure 5A:
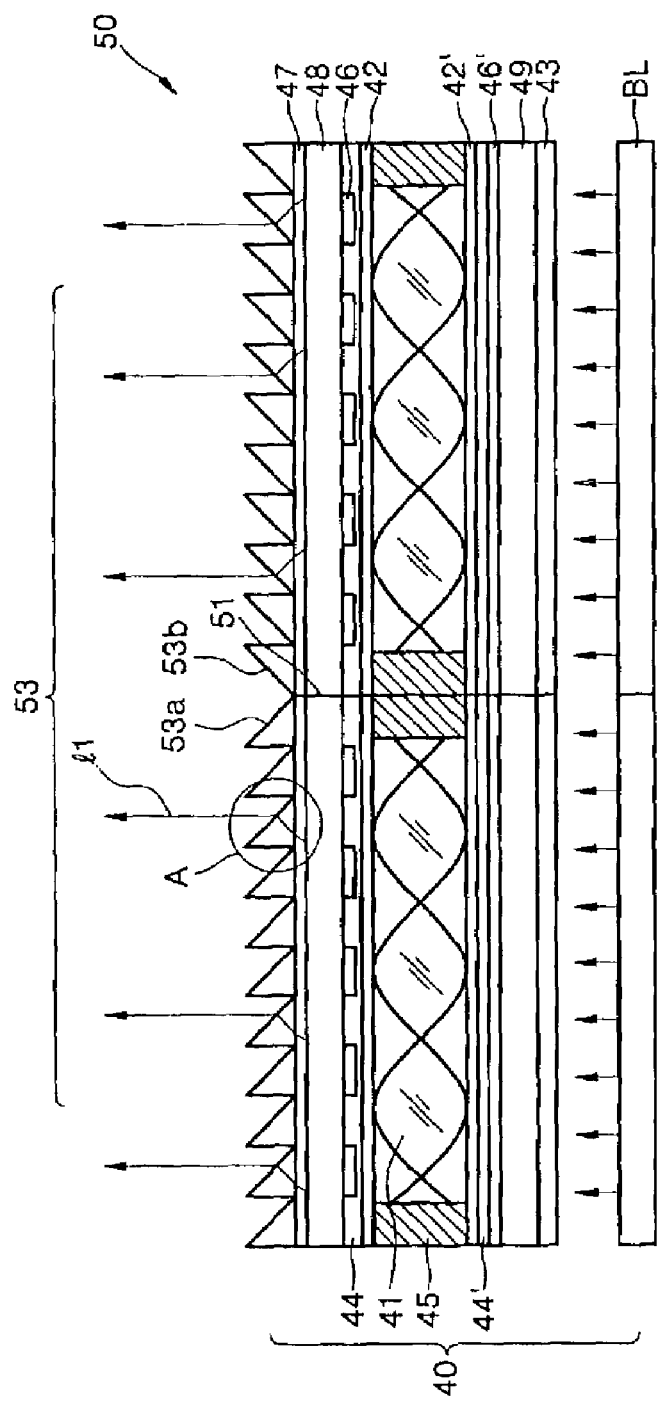
FIG. 5A is a sectional view illustrating a multi-display apparatus, according to a first aspect of the present invention.

Referring to FIG. 5A, the multi-display apparatus, according to the first aspect of the present invention includes an LCD device 40 which generates the image, and a triangular prism array 53 arranged on an upper surface of the LCD device 40 as an optical path changing unit. Flat panel display devices such as FET, PDP, and EL may be used instead of the LCD device 40.

In general, the LCD device 40 is a display showing the image by transmitting and blocking light by using a liquid crystal substance having dielectric anisotropy. The LCD device 40 can be classified into a transmission type LCD which displays the image by transmitting a backlight beam and a reflection type LCD which displays the image by reflecting incident natural light.

The LCD device 40 is a transflective type LCD device and includes upper and lower substrates 48 and 49 arranged to face each other, a pair of transparent electrodes 46 and 46' formed on a lower surface of the upper substrate 48 and an upper surface of the lower substrate 49, in strips, to be perpendicular to each other, a pair of insulation layers 44 and 44' deposited in order on the transparent electrodes 46 and 46', and a pair of alignment layers 42 and 42' formed on the insulation layers 44 and 44'. An LCD layer 41 is formed between the alignment layers 42 and 42' by injecting a liquid crystal substance into a space between the upper and lower substrates 48 and 48' sealed by a sealant 45. A polarizing film 47 is attached to an upper surface of the upper substrate 48 to transmit a predetermined polarized light. A transflective reflection film 43 is attached to a lower surface of the lower substrate 49 to reflect natural light incident through the upper substrate 48 and transmit a backlight (BL) beam.

The array 53, which is the optical path changing unit, is formed by arranging a plurality of triangular prisms 53a in strips having an inclined surface at a predetermined angle in a line at one side with respect to a boundary surface 51 of the LCD device 40 and a plurality of triangular prisms 53b at the other side so that the prisms 53a and 53b are symmetrical. After passing through the polarized film 47 of the LCD device 40, a light l1 is incident on triangular prisms 53a and 53b and is refracted twice. As the optical path is moved toward the boundary surface 51, the light l1 is emitted toward a screen (not shown). Thus, owing to the movement of the optical path of the light l1, the non-display area appearing in the light shield area is removed. The light shield area is sealed by the sealant 51 and does not transmit light.

Figure 5B:
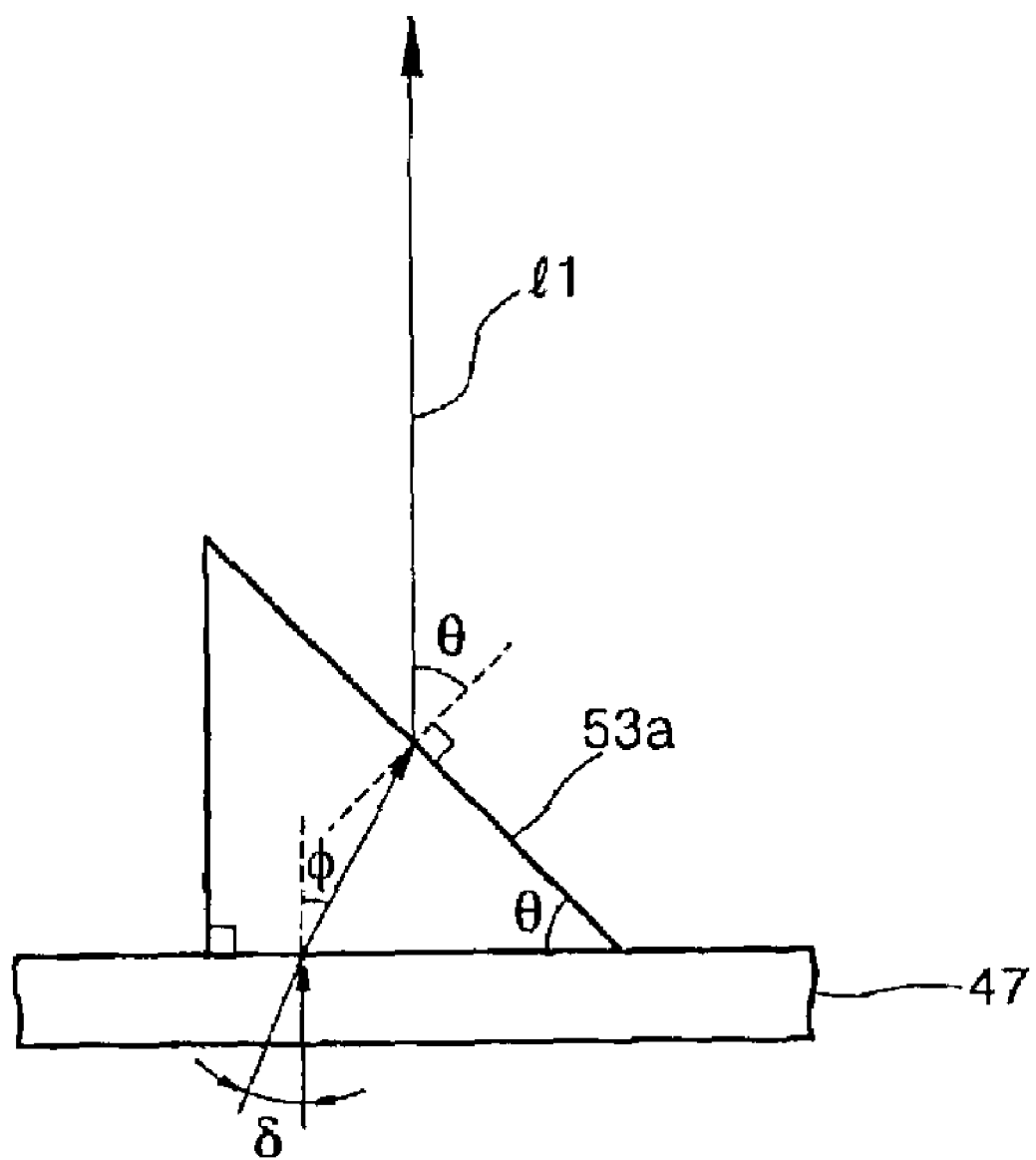
FIG. 5B is an enlarged view illustrating a portion A of FIG. 5A.

FIG. 5B is an enlarged view of a portion A of FIG. 5A. In FIG. 5B, the light l1 output from the polarizing film 47 is incident on the triangular prism 53a at a predetermined angle d and is refracted at an angle f according to Snell's rule. Then, the light l1 is refracted again as the light passes through the triangular prism 53a and is emitted at an angle q. Assuming that a refractive index of the triangular prism 53a and a refractive index of the polarizing film 47 are n and n' (<n), respectively, because an angle made between an inclined surface of the triangular prism 53a and a surface of the polarizing film 47 is the same as the refractive angle q of the light l1 output from the triangular prism 43a, the angel q can be obtained from Equation 1.

$$n' \sin d = n \sin f = \sin q \qquad \text{Equation 1}$$

As shown in FIGS. 5A and 5B, the triangular prisms 53a and 53b having the inclined surfaces inclined at a predetermined angle with respect to the boundary surface 51 are arranged symmetrically with respect to the boundary surface 51. Then, the light l1 output from the polarizing film 47 proceeds with the optical path horizontally shifted toward the boundary surface 51, so that the non-display area is removed from the image displayed on the screen.

Figure 6:
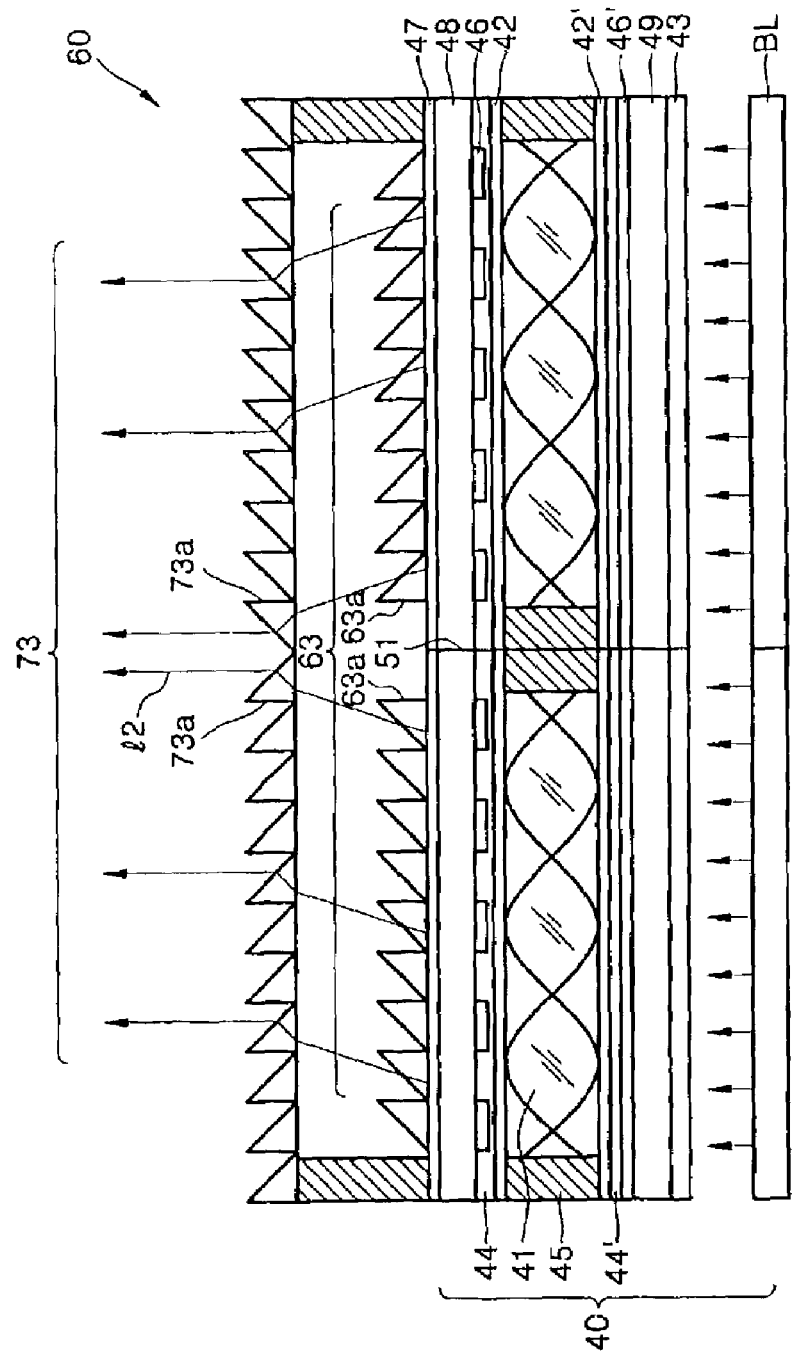
FIG. 6 is a sectional view illustrating a multi-display apparatus, according to a second aspect of the present invention.

FIG. 6 shows a flat panel display device, according to a second aspect of the present invention. Referring to FIG. 6, a flat panel display device 60, according to the second aspect of the present invention, uses the same device as the LCD device of the flat panel display device 50, according to the first aspect of the present invention, and includes first and second triangular prism arrays 63 and 73 formed on the LCD device as the optical path changing unit.

The second triangular prism array 73 is formed of a plurality of prisms 73a which are arranged such that inclined surfaces are symmetrical to the left and right with respect to the boundary surface 51, like the triangular prism array 53 as shown in FIG. 5A. The first triangular prism array 63 is disposed under the second triangular prism array 73 at a predetermined interval. In the first triangle array 63, inclined surfaces of the left and right prism arrays 63a are arranged to be symmetrical to each other and also symmetrical to the inclined surfaces of the second triangular prism array 73.

Referring to FIG. 6, light l2 output from the polarizing film 47, passes through the first triangular prism array 63 and is refracted twice. While passing through the second triangular prism array 63, the light l2 is refracted twice and the optical path of the light l2 is horizontally shifted toward the boundary surface 51. The light l2 emitted to the screen (not shown) can form the image without the non-display area.

Figure 7:
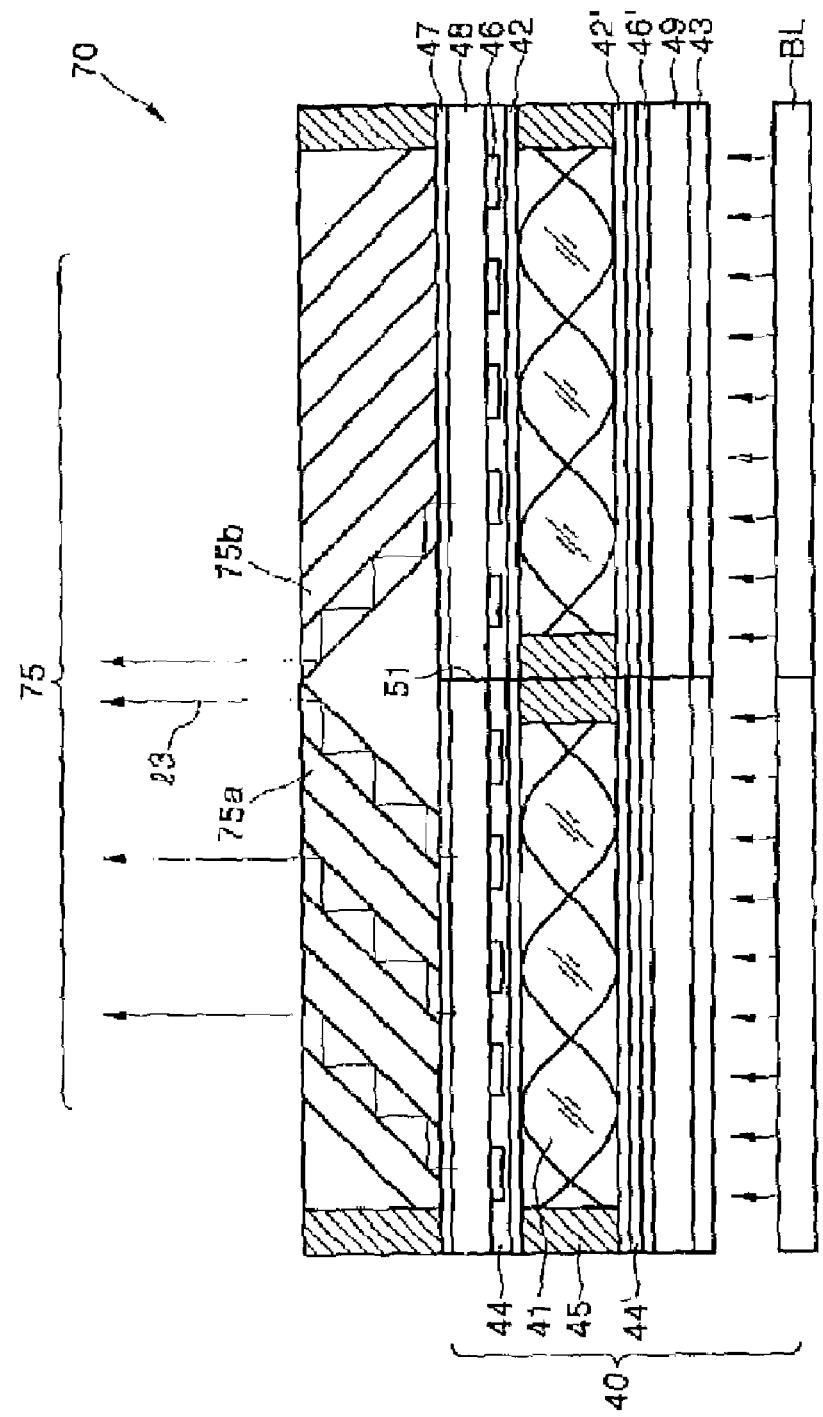
FIG. 7 is a sectional view illustrating a multi-display apparatus, according to a third aspect of the present invention.

FIG. 7 shows a flat panel display device, according to a third aspect of the present invention. Referring to FIG. 7, a flat panel display device 70 according to the third aspect of the present invention uses the same device as the LCD device of the flat panel display device 50, according to the first aspect of the present invention, and includes a wave guide array 75 formed on the LCD device as the optical path changing unit. The wave guide array 75 includes a plurality of wave guides 75a, which are parallel to one another and inclined at a predetermined angle with respect to the boundary surface 51.

A light l3 output from the polarizing film 47 is incident on the wave guides 75a at a predetermined angle proceeding by being totally reflected. Because the wave guide 75a is inclined at a predetermined angle with respect to the boundary surface 51, the light l3 proceeding through the wave guide 75a is guided toward the boundary surface 51. For example, the light l3 emitted perpendicularly to the flat surface of the polarizing film 47 is totally reflected at an angle of 45° by the inner surface of the wave guides 75a having an inclination angle of 45° and is output to be perpendicular to the surface of the wave guides 75a. Thus, a complete image is formed by removing the non-display area.

Figure 8:
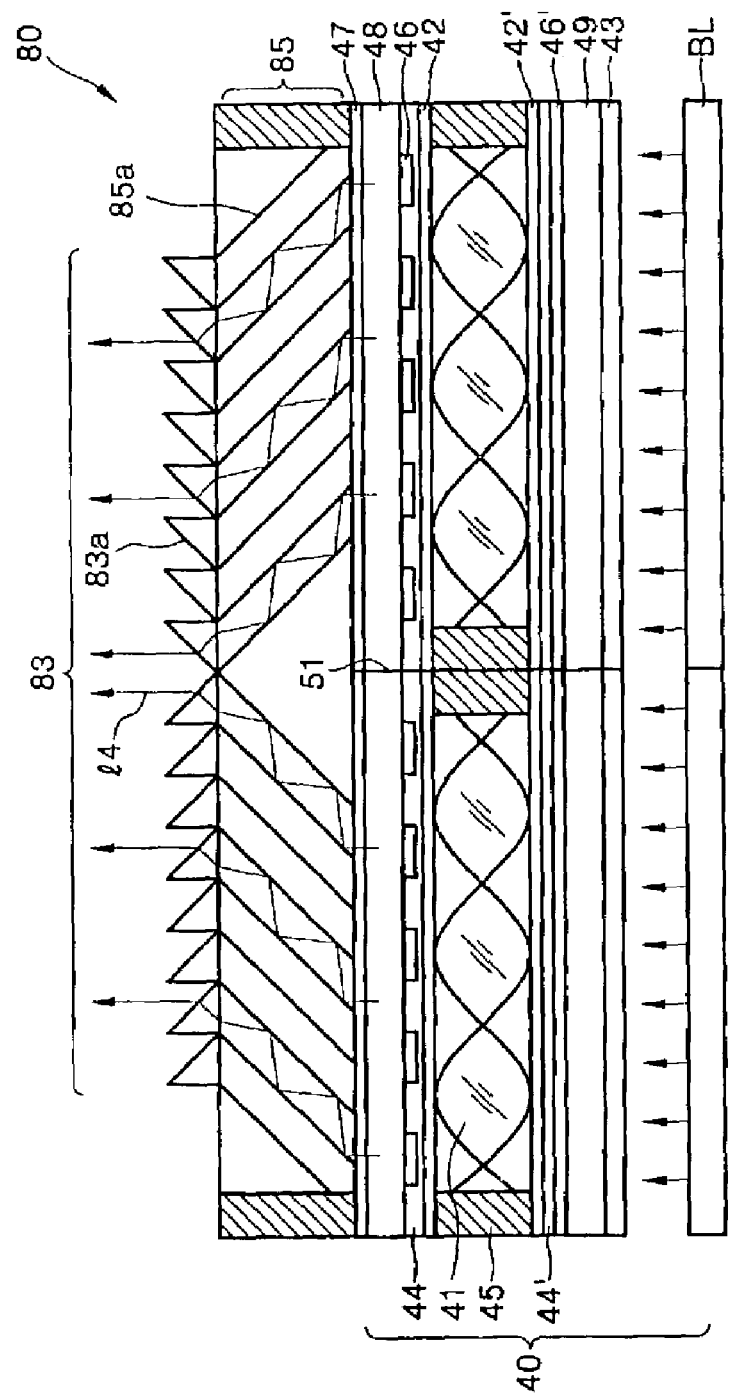
FIG. 8 is a sectional view illustrating a multi-display apparatus, according to a fourth aspect of the present invention.

FIG. 8 shows the flat panel display device, according to a fourth aspect of the present invention. Referring to FIG. 8, a flat panel display device 80, according to the fourth aspect of the present invention, uses the same device as the LCD device of the flat panel display device 50 according to the first aspect of the present invention, and includes an assembly of a wave guide array 85 and a triangular prism array 83 disposed above the LCD device as the optical path changing unit.

The wave guide array 85 is formed of a plurality of wave guides 85a that are arranged parallel to one another and symmetrically inclined at a predetermined angle with respect to the boundary surface 51, similar to the wave guide array 75 shown in FIG. 7. The triangular prism array 83 is formed of triangular prisms 83a having surfaces inclined by a predetermined angle with respect to the boundary surface 51 which are arranged symmetrically to the left and right with respect to the boundary surface 51, similarly to the triangular prism array 53 shown in FIG. 5. A light l4 passes through the wave guide array 85 and is refracted twice in the prism array 83. Then, the light l4 is output toward the boundary surface 51 of the screen (not shown) so that a complete image without the non-display area is realized.

Figure 9:
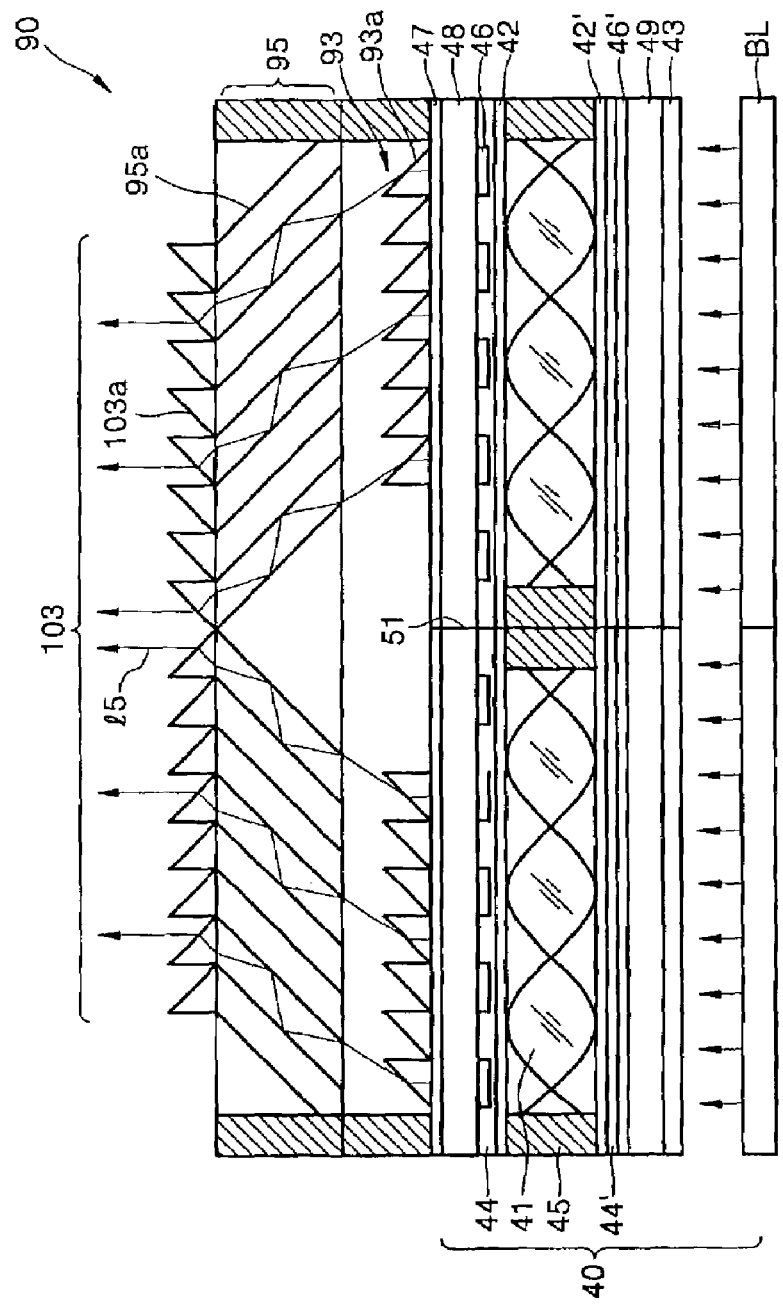
FIG. 9 is a sectional view illustrating a multi-display apparatus, according to a fifth aspect of the present invention.
Figure 10A:
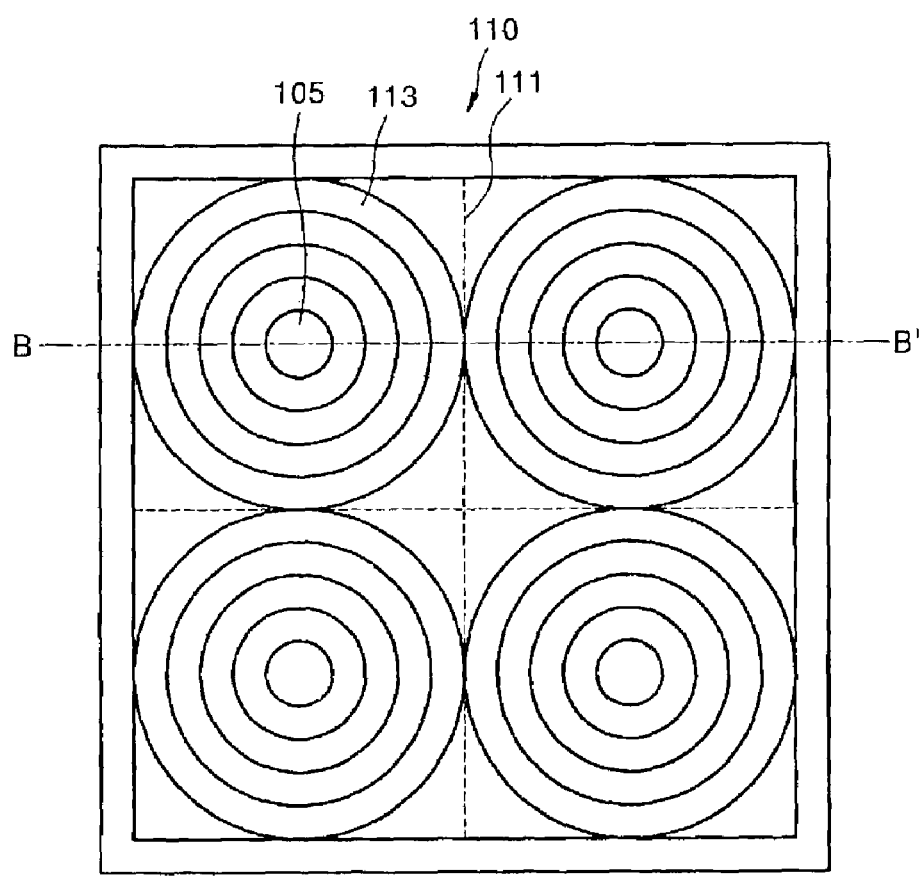
FIG. 10A is a plan view illustrating a multi-display apparatus, according to a sixth aspect of the present invention.
Figure 10B:
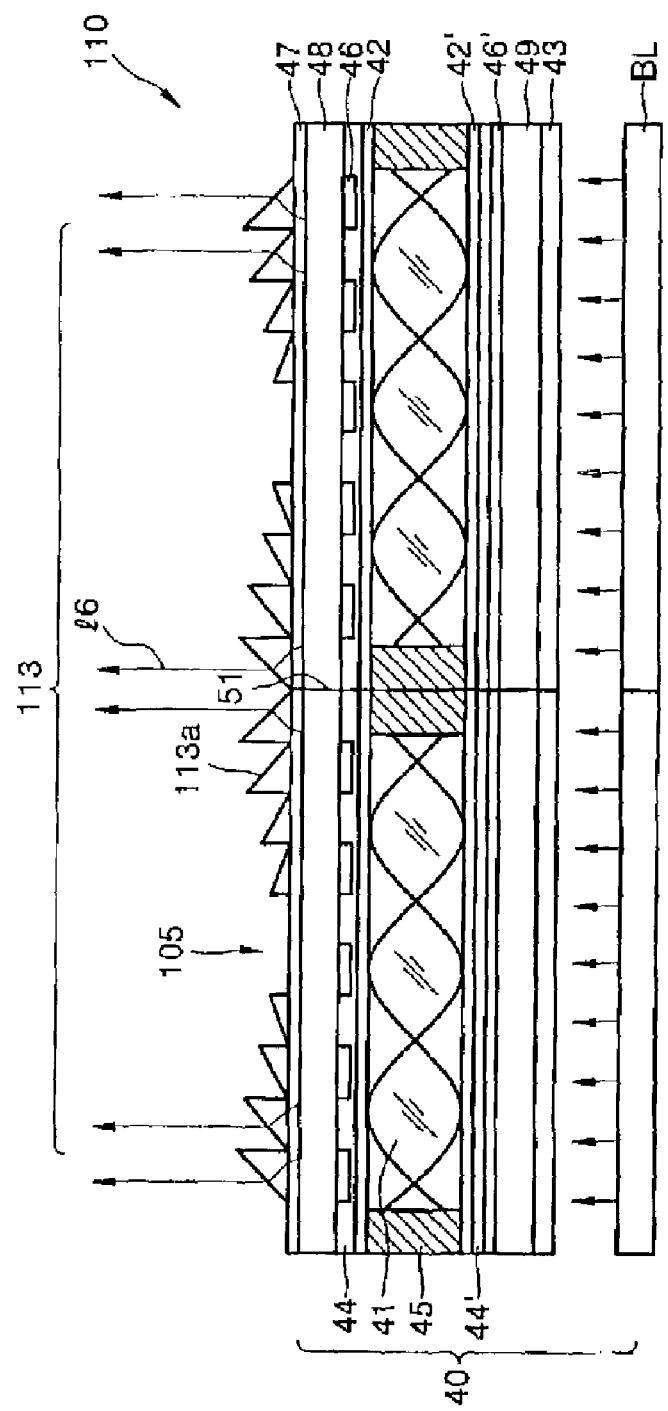
FIG. 10B is a sectional view illustrating the multi-display apparatus of FIG. 10A.

FIG. 9 shows the flat panel display device, according to a fifth aspect of the present invention. Referring to FIG. 9, a flat panel display device 90 according to the fifth aspect of the present invention, uses the LCD device 40 of the flat panel display device 50 according to the first aspect of the present invention and includes an assembly of a first triangular prism array 93 disposed on the LCD device 40 as the optical path changing unit The flat panel display device 90 includes a wave guide array 95 disposed above the first triangular prism array 93 by being separated a predetermined distance therefrom, and a second triangular prism array 103 disposed on the wave guide array 95, where the wave guide array 95 and the second triangular prism array 103 are also elements of the optical path changing unit.

The light l5 is refracted twice by the first triangular prism array 93 formed of a plurality of prism arrays 93a arranged symmetrically with respect to the boundary surface 51 and is input to the wave guide array 95, which is formed of a plurality of wave guides 95a arranged symmetrically with respect to the boundary surface 51. Then, the light l5 is totally reflected by the inner surface of the wave guides 95a and proceeds to be incident on the second triangular prism array 103, which has inclined surfaces symmetrical to the first triangular prism array 93 and simultaneously arranged to the left and right thereof, and the light l5 is refracted twice and emitted to the screen (not shown).

In the flat panel display devices according to the first through fifth aspects of the present invention, the angles of the inclined surfaces of the triangular prisms 53a, 63a, 73a, 83a, 93a, and 103a may be formed to be identical. However, by decreasing the inclination angle from the boundary surface 51 toward the outside, distortion of the image can be reduced.

In the flat panel display devices, according to the first through fifth aspects of the present invention, because the angles of the inclined surfaces of the triangular prisms 53a, 63a, 73a, 83a, 93a, and 103a can be formed to decrease from the boundary surface 51 toward the outside, a view angle is extended and the non-display area is removed so that a resolution and an image quality can be improved.

FIG. 10A shows the optical path changing unit of the flat panel display device according to a sixth aspect of the present invention. FIG. 10B is a sectional view of the flat panel display device of FIG. 10A. A flat panel display device 110, according to the sixth aspect of the present invention, as shown in FIGS. 10A and 10B, mainly uses a large screen display device where a plurality of flat panel display devices are connected.

Referring to FIGS. 10A and 10B, a plurality of flat panel display devices (not shown), for instance, four flat panel display devices, are connected like a chess board and a plurality of Fresnel lens type triangular prisms 113a of a Fresnel lens type are coaxially arranged on each of the flat panel display devices. The triangular prisms 113a are arranged symmetrically to the left and right with respect to a center portion 105 and the boundary surface 51 where two screens contact each other, forming a triangular prism array 113. The inclination angle of an inclined surface of each of the triangular prisms 113a, which is adjacent to the boundary surface 51, decreases toward the center portion of each panel display device. The triangular prisms 113a are not arranged in the center portion 105 of the screen.

Here, a Fresnel lens is formed by separating a plurality of circular lenses to generate a plurality of parallel beams. Thus, the triangular prisms 113a are arranged concentrically and make the light emitted from the flat panel display device into a plurality of parallel beams by gradually decreasing the inclination angle of the inclined surface from a predetermined angle to 0°.

A light l6 emitted close to the boundary surface 51 is incident on the Fresnel lens type triangular prism array 113 and is refracted twice so that an optical path of the light l6 is guided toward the boundary surface 51. Because the inclination angle of the triangular prism 113a decreases toward the central portion 105 of the screen, a degree of horizontal movement of the optical path of the light l6 emitted closer to the central portion 105 of the screen than the boundary surface 51 is lowered so that the distortion of the image is prevented. Because the triangular prism 113a is not arranged at the central portion 105 of the screen, the light l6 is emitted at the original emission angle. The above Fresnel lens type triangular prism array 113 is arranged on the flat panel display device 40 so that an image displayed on the plurality of large screens is not divided or distorted and can be smoothly presented.

According to an aspect of the present invention, an optical path changing unit is provided above a plurality of flat panel display devices to move an optical path of a light emitted from the flat panel display devices toward a boundary surface. Thus, a non-display area of an image displayed on a screen is removed and a view angle is extended so that a resolution and an image quality are improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A multi-display apparatus, comprising:
   flat panel display devices having adjacent sides connected to each other;
   an optical path changing unit having at least one inclined surface symmetrical to a boundary surface of the flat panel display devices and shifting light emitted from the flat panel display devices toward a boundary surface between the flat panel display devices to display an image without a non-display area, at least one of the inclined surfaces being an exit surface where light leaves the optical path changing unit; and
   a polarizing film adjacent to the optical path changing unit and having a smaller refractive index than a refractive index of the optical path changing unit,
   wherein the light passes through the polarizing film, is incident on the optical path changing unit and is refracted, and at least one of the inclined surfaces of the optical path changing unit refracts the previously refracted light as the light is emitted from the inclined exit surface of the optical path changing unit, and
   wherein the light is output from the inclined exit surface of the optical path changing unit to be perpendicular with respect to a light-entering surface of the optical path changing unit and horizontally shifted toward the boundary surface.

2. The multi-display apparatus as claimed in claim 1, wherein the optical path changing unit comprises a triangular prism array having an inclined surface symmetrical with respect to the boundary surface.

3. The multi-display apparatus as claimed in claim 2, wherein the triangular prism array comprises an upper triangular array and a lower triangular array in which an inclination surface of the upper triangular prism array and an inclination surface of the lower triangular prism array are symmetrical.

4. The multi-display apparatus as claimed in claim 3, wherein an inclination angle of the inclined surface decreases as a triangular prism in the triangular prism array is positioned farther away from the boundary surface.

5. The multi-display apparatus as claimed in claim 2, wherein an inclination angle of the inclined surface decreases as a triangular prism in the triangular prism array is positioned farther away from the boundary surface.

6. The multi-display apparatus as claimed in claim 1, wherein the optical path changing unit comprises an assembly of a wave guide array having an inclined surface symmetrical to the boundary surface and a triangular prism array disposed on an upper surface of the wave guide array and having a surface inclined in a direction opposite to the inclined surface of the wave guide array and symmetrical to the boundary surface wherein the light incident on the triangular prism array is refracted and the inclined surface of the triangular prism array refracts the previously refracted light as the light is emitted from the inclined surface of the triangular prism array.

7. The multi-display apparatus as claimed in claim 6, wherein an inclination angle of the inclined surface decreases as a triangular prism in the triangular prism array is positioned farther away from the boundary surface.

8. The multi-display apparatus as claimed in claim 1, wherein the optical path changing unit comprises an assembly of a first triangular prism array having an inclined surface symmetrical to the boundary surface, a wave guide array having an inclined surface inclined in a same direction as the first triangular prism array and symmetrical to the boundary surface, and a second triangular prism array disposed on an upper surface of the wave guide array and having an inclined surface symmetrical to the first triangular prism array, wherein the light incident on at least one of the triangular prism arrays is refracted and the inclined surface of at least one of the prism arrays refracts the previously refracted light as the light is emitted from the inclined surface of the triangular prism array.

9. The multi-display apparatus as claimed in claim 8, wherein an inclination angle of the inclined surface decreases as a triangular prism in the triangular prism array is positioned farther away from the boundary surface.

10. The multi-display apparatus as claimed in claim 1, wherein the optical path changing unit is a Fresnel lens type triangular prism array formed of triangular prisms having inclined surfaces symmetrical to the boundary surface and arranged concentrically with respect to a center of each of the flat panel display devices.

11. The multi-display apparatus as claimed in claim 10, wherein an inclination angle of the inclined surface decreases as a triangular prism in the triangular prism array is positioned farther away from the boundary surface.

12. The multi-display apparatus as claimed in claim 1, wherein the flat panel display device is any one of an LCD, a PDP, an FED, and an EL.

13. A multi-display apparatus, comprising:
flat panel devices having adjacent sides connected to each other forming a boundary surface therebetween, comprising:
upper and lower substrates,
a pair of transparent electrodes, one formed on a lower surface of the upper substrate and another on an upper surface of the lower substrate,
a pair of insulation layers deposited on the transparent electrodes, and
a pair of alignment layers formed on the insulation layers;
a triangular prism array arranged on an upper surface of the flat panel devices shifting light emitted from the flat panel display devices toward the boundary surface, the triangular prism array having an inclined exit surface where light leaves the triangular prism array; and
a polarizing film adjacent to the triangular prism array and having a smaller refractive index than a refractive index of the triangular prism array,
wherein the light passes through the polarizing film, is incident on the triangular prism array and is refracted, and the inclined exit surface of the triangular prism array refracts the previously refracted light as the light is emitted from the inclined exit surface of the triangular prism array, and
wherein the light is output from the inclined exit surface of the triangular prism array to be perpendicular with respect to a light-entering surface of the triangular prism array and horizontally shifted toward the boundary surface.

14. The multi-display apparatus as claimed in claim 13, wherein an LCD layer is formed between the alignment layers by injecting a liquid crystal substance into a space between the upper and lower substrates.

15. The multi-display apparatus as claimed in claim 13, wherein the flat panel devices further comprises:
a transflective reflection film attached to a lower surface of the lower substrate to reflect natural light incident through the upper substrate and transmit a backlight (BL) beam, and wherein the polarizing film is attached to an upper surface of the upper substrate to transmit a predetermined polarized light.

16. The multi-display apparatus as claimed in claim 13, wherein flat panel display device is an LCD, an FET, a PDP, or an EL.

17. The multi-display apparatus as claimed in claim 13, wherein the flat panel display device is a transflective type LCD device.

18. The multi-display apparatus as claimed in claim 13, wherein the triangular prism array is formed by arranging a first set of prisms in strips having an inclined surface at a predetermined angle at one side of the boundary surface of the flat panel devices and a second set of prisms at another side of the boundary surface, where the first and second set of prisms are symmetrical with respect to the boundary surface.

19. The multi-display apparatus as claimed in claim 13, wherein the triangular prism array is formed with triangular prisms having the inclined surfaces inclined at a predetermined angle with respect to the boundary surface of the flat panel devices, and the triangular prisms are arranged symmetrically with respect to the boundary surface.

20. A multi-display apparatus, comprising:
flat panel devices having adjacent sides connected to each other forming a boundary surface therebetween;
first and second triangular prism arrays arranged on a surface of the flat panel devices shifting light emitted from the flat panel display devices toward the boundary surface, at least one of the triangular prism arrays having an inclined exit surface where light leaves the at least one triangular prism array; and
a polarizing film adjacent to one of the triangular prism arrays and having a smaller refractive index than a refractive index of one of the triangular prism arrays,
wherein the light passes through the polarizing film, is incident on at least one of the triangular prism arrays and is refracted, and the inclined exit surface of at least one of the triangular prism arrays refracts the previously refracted light as the light is emitted from the inclined exit surface of the triangular prism array, and
wherein the light is output from the inclined exit surface of the at least one of the triangular prism arrays to be perpendicular with respect to a light-entering surface of the at least one triangular prism array and horizontally shifted toward the boundary surface.

21. The multi-display apparatus as claimed in claim 20, further comprising:
upper and lower substrates,
a pair of transparent electrodes, one formed on a lower surface of the upper substrate and another on an upper surface of the lower substrate,
a pair of insulation layers deposited on the transparent electrodes, and
a pair of alignment layers formed on the insulation layers.

22. The multi-display apparatus as claimed in claim 20, wherein the second triangular prism array comprises a plurality of prisms having inclined surfaces arranged symmetrically with respect to the boundary surface of the flat panel devices.

23. The multi-display apparatus as claimed in claim 21, wherein the first triangular prism array is disposed under the second triangular prism array at a predetermined interval, where the first triangle array comprises a plurality of prisms having inclined surfaces arranged symmetrically with respect to the inclined surfaces of the second triangular prism array.

24. The multi-display apparatus as claimed in claim 20, wherein the optical path of the light is horizontally shifted toward the boundary surface to form the image without the non-display area.

25. A multi-display apparatus, comprising:
flat panel devices having adjacent sides connected to each other forming a boundary surface therebetween; and
a wave guide array arranged on a surface of the flat panel devices and comprising a plurality of wave guides parallel to one another and inclined at a predetermined angle with respect to the boundary surface, wherein the wave guide array shifts light emitted from the flat panel display devices toward the boundary surface;
wherein the light is output from the wave guides to be perpendicular to the surface of the wave guides.

26. The multi-display apparatus as claimed in claim 25, further comprising:
upper and lower substrates
a pair of transparent electrodes, one formed on a lower surface of the upper substrate and another on an upper surface of the lower substrate,
a pair of insulation layers deposited on the transparent electrodes, and
a pair of alignment layers formed on the insulation layers.

27. A multi-display apparatus, comprising:
flat panel devices having adjacent sides connected to each other forming a boundary surface therebetween;
a wave guide array and a triangular prism array arranged on a surface of the flat panel devices shifting light emitted from the flat panel display devices toward the boundary surface, the triangular prism array having an inclined exit surface where light leaves the triangular prism array; and
a polarizing film adjacent to at least one of the wave guide array and the triangular prism array,
wherein the light passes through the polarizing film, is incident on the triangular prism array and is refracted and the inclined exit surface of the triangular prism array refracts the previously refracted light as the light is emitted from the inclined exit surface of the triangular prism array, and
wherein the light is output from the inclined exit surface of the triangular prism array to be perpendicular with respect to a light-entering surface of the triangular prism array and horizontally shifted toward the boundary surface.

28. The multi-display apparatus as claimed in claim 27, further comprising:
upper and lower substrates,
a pair of transparent electrodes, one formed on a lower surface of the upper substrate and another on an upper surface of the lower substrate,
a pair of insulation layers deposited on the transparent electrodes, and
a pair of alignment layers formed on the insulation layers.

29. The multi-display apparatus as claimed in claim 27, wherein the wave guide array comprises a plurality of wave guides arranged parallel to one another and symmetrically inclined at a predetermined angle with respect to the boundary surface.

30. The multi-display apparatus as claimed in claim 27, wherein the triangular prism array comprises triangular prisms having surfaces inclined by a predetermined angle with respect to the boundary surface and symmetrically arranged with respect to the boundary surface.

31. A multi-display apparatus, comprising:
flat panel devices having adjacent sides connected to each other forming a boundary surface therebetween;
a first triangular prism array arranged on a surface of the flat panel devices;
a wave guide array disposed above the first triangular prism array and separated a predetermined distance therefrom; and
a second triangular prism array disposed on the wave guide array, wherein the first triangular prism array, the wave guide array, and the second triangular prism array shift light emitted from the flat panel display devices toward the boundary surface.

32. The multi-display apparatus as claimed in claim 31, further comprising:
upper and lower substrates,
a pair of transparent electrodes, one formed on a lower surface of the upper substrate and another on an upper surface of the lower substrate,
a pair of insulation layers deposited on the transparent electrodes, and
a pair of alignment layers formed on the insulation layers.

33. The multi-display apparatus as claimed in claim 31, wherein the wave guide array comprises:
a plurality of wave guides arranged symmetrically with respect to the boundary surface.

34. A multi-display apparatus, comprising:
flat panel devices having adjacent sides connected to each other forming a boundary surface therebetween;
Fresnel lens type triangular prisms coaxially arranged on each of the flat panel display devices, wherein the triangular prisms are arranged symmetrically to a left and a right of a center portion of each of the flat panel display devices and the boundary surface to form a triangular prism array to shift light emitted from the flat panel display devices toward the boundary surface; and
a polarizing film adjacent to one of the triangular prism arrays and having a smaller refractive index than a refractive index of one of the triangular prism arrays,
wherein the light passes through the polarizing film, is incident on at least one of the triangular prism arrays and is refracted, and an inclined exit surface of at least one of the triangular prism arrays refracts the previously refracted light as the light is emitted from the inclined surface of the triangular prism array, the inclined exit surface being a surface where light leaves the triangular prism array, and
wherein the light is output from the inclined exit surface of at least one of the triangular prism arrays to be perpendicular with respect to a light-emitting surface of the at least one of the triangular prism arrays and horizontally shifted toward the boundary surface.

35. The multi-display apparatus as claimed in claim 34, further comprising:
upper and lower substrates,
a pair of transparent electrodes, one formed on a lower surface of the upper substrate and another on an upper surface of the lower substrate,
a pair of insulation layers deposited on the transparent electrodes, and
a pair of alignment layers formed on the insulation layers.

36. The multi-display apparatus as claimed in claim 34, wherein an inclination angle of each of the triangular prisms that are adjacent to the boundary surface decrease toward the center portion of each panel display device.

* * * * *

UNITED STATES PATENT AND TRADEMARK OFFICE
CERTIFICATE OF CORRECTION

| | | |
|---|---|---|
| PATENT NO. | : 7,439,938 B2 | Page 1 of 1 |
| APPLICATION NO. | : 10/461327 | |
| DATED | : October 21, 2008 | |
| INVENTOR(S) | : Kun-ho Cho et al. | |

It is certified that error appears in the above-identified patent and that said Letters Patent is hereby corrected as shown below:

On the Title Page, Item (56) (U.S. Patent Documents), Line 2, change "Sekiguchi et al." to --Suzuki et al.--.

Column 8, Line 55, change "surface" to --surface,--.

Column 11, Line 18, change "substrates" to --substrates,--.

Signed and Sealed this

Sixth Day of January, 2009

JON W. DUDAS
*Director of the United States Patent and Trademark Office*